United States Patent
Hamada et al.

(10) Patent No.: US 11,198,100 B2
(45) Date of Patent: Dec. 14, 2021

(54) COMPOSITE SEMIPERMEABLE MEMBRANE AND METHOD FOR PRODUCING COMPOSITE SEMIPERMEABLE MEMBRANE

(71) Applicant: TORAY INDUSTRIES, INC., Tokyo (JP)

(72) Inventors: Tsuyoshi Hamada, Shiga (JP); Jun Okabe, Shiga (JP); Takafumi Ogawa, Shiga (JP); Koji Nakatsuji, Ehime (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 71 days.

(21) Appl. No.: 16/314,295

(22) PCT Filed: Jun. 29, 2017

(86) PCT No.: PCT/JP2017/024017
§ 371 (c)(1),
(2) Date: Dec. 28, 2018

(87) PCT Pub. No.: WO2018/003943
PCT Pub. Date: Jan. 4, 2018

(65) Prior Publication Data
US 2020/0188861 A1    Jun. 18, 2020

(30) Foreign Application Priority Data
Jun. 29, 2016  (JP) .............................. JP2016-128624
Jun. 29, 2016  (JP) .............................. JP2016-128625

(51) Int. Cl.
| | |
|---|---|
| *B01D 69/12* | (2006.01) |
| *B01D 67/00* | (2006.01) |
| *B01D 69/10* | (2006.01) |
| *B01D 71/56* | (2006.01) |
| *B01D 71/82* | (2006.01) |
| *C02F 1/44* | (2006.01) |

(52) U.S. Cl.
CPC ....... *B01D 69/125* (2013.01); *B01D 67/0093* (2013.01); *B01D 69/105* (2013.01); *B01D 71/56* (2013.01); *B01D 71/82* (2013.01); *C02F 1/44* (2013.01); *B01D 2323/02* (2013.01); *B01D 2323/30* (2013.01); *B01D 2325/02* (2013.01); *B01D 2325/14* (2013.01); *B01D 2325/36* (2013.01)

(58) Field of Classification Search
CPC ............ B01D 2323/02; B01D 2323/30; B01D 2325/36; B01D 67/0093; B01D 69/125; B01D 71/56; C02F 1/44
See application file for complete search history.

(56) References Cited

U.S. PATENT DOCUMENTS

| | | | | |
|---|---|---|---|---|
| 4,964,998 A * | 10/1990 | Cadotte | ................ | B01D 61/025 210/654 |
| 5,215,692 A * | 6/1993 | Horl | .................. | B01D 67/0093 210/500.37 |
| 6,280,853 B1 * | 8/2001 | Mickols | ............. | B01D 67/0093 210/490 |
| 7,677,398 B2 * | 3/2010 | Belter | .................... | B01D 71/56 210/500.38 |
| 8,544,658 B2 | 10/2013 | Stenzel et al. | | |
| 2011/0189469 A1 | 8/2011 | Stenzel et al. | | |
| 2012/0318730 A1 | 12/2012 | Tamai et al. | | |
| 2013/0306550 A1 | 11/2013 | Jeong et al. | | |
| 2014/0183128 A1 | 7/2014 | Lee et al. | | |
| 2015/0157990 A1 * | 6/2015 | Roy | ...................... | B01D 69/10 210/490 |
| 2015/0343393 A1 * | 12/2015 | Yoneda | .................. | B01D 71/44 210/490 |
| 2016/0008773 A1 * | 1/2016 | Yoneda | .................... | B32B 27/34 210/500.33 |
| 2016/0243503 A1 | 8/2016 | Okabe et al. | | |
| 2017/0120201 A1 * | 5/2017 | Shimura | ................. | C08G 69/32 |
| 2020/0188861 A1 * | 6/2020 | Hamada | ................ | B01D 71/82 |

FOREIGN PATENT DOCUMENTS

| | | |
|---|---|---|
| CN | 103143270 A | 6/2013 |
| CN | 103917288 A | 7/2014 |
| CN | 105026022 A | 11/2015 |

(Continued)

OTHER PUBLICATIONS

International Search Report, issued in PCT/JP2017/024017, PCT/ISA/210, dated Sep. 5, 2017.
Written Opinion of the International Searching Authority, issued in PCT/JP2017/024017, PCT/ISA/237, dated Sep. 5, 2017.
Cheng et al., "Surface modification of a commercial thin-film composite polyamide reverse osmosis membrane through graft polymerization of N-isopropylacrylamide followed by acrylic acid," Journal of Membrane Science, vol. 447, 2013 (published online Jul. 22, 2013), pp. 236-245.

(Continued)

*Primary Examiner* — Ana M Fortuna
(74) *Attorney, Agent, or Firm* — Birch, Stewart, Kolasch & Birch, LLP

(57) ABSTRACT

The present invention relates to a composite semipermeable membrane including: a supporting membrane including a substrate and a porous supporting layer; and a separation functional layer disposed on the porous supporting layer, in which the separation functional layer includes: a crosslinked polyamide; and a hydrophilic polymer which is a polymer of a monomer having an ethylenically unsaturated group, and a surface of the separation functional layer has a ratio of the number of oxygen atoms to the number of nitrogen atoms (O/N ratio), both determined by X-ray photoelectron spectrometry, of 1.5-10, and a standard deviation of the O/N ratio of 0.15 or larger.

10 Claims, No Drawings

(56) References Cited

FOREIGN PATENT DOCUMENTS

| | | |
|---|---|---|
| CN | 105611994 A | 5/2016 |
| EP | 2 140 929 A1 | 1/2010 |
| EP | 2140929 A1 | 1/2010 |
| JP | 2000-176263 A | 6/2000 |
| JP | 2001-286741 A | 10/2001 |
| JP | 2010/12455 A | 1/2010 |
| JP | WO2011/108580 A1 | 9/2011 |
| JP | 2011-529789 A | 12/2011 |
| KR | 10-2010-0003799 A | 1/2010 |
| KR | 10-2016-0063337 A | 6/2016 |
| WO | WO 2010/015599 A1 | 2/2010 |
| WO | WO 2014/133130 A1 | 9/2014 |
| WO | WO 2014/133133 A1 | 9/2014 |
| WO | WO 2015/046582 A1 | 4/2015 |
| WO | WO 2016/002819 A1 | 1/2016 |

OTHER PUBLICATIONS

Extended European Search Report for European Application No. 17820297.4, dated Jan. 27, 2020.

Hu et al., "Enhancing the performance of aromatic polyamide reverse osmosis membrane by surface modification via covalent attachment of polyvinyl alcohol (PVA)," Journal of Membrane Science, vol. 501, 2016 (published online Dec. 4, 2015), pp. 209-219.

Liu et al., "Improving fouling resistance and chlorine stability of aromatic polyamide thin-film composite RO membrane by surface grafting of polyvinyl alcohol (PVA)," Desalination, vol. 367, 2015 (published online Mar. 28, 2015), pp. 11-20.

Mansourpanah et al., "Preparation and modification of thin film PA membranes with improved antifouling property using acrylic acid and UV irradiation," Journal of Membrane Science, vol. 430, 2013 (available online Dec. 12, 2012), pp. 158-166.

Mondal et al., "Photo-induced graft polymerization of N-isopropyl acrylamide on thin film composite membrane: Produced water treatment and antifouling properties," Separation and Purification Technology, vol. 90, 2012 (Feb. 28, 2012), pp. 231-238.

Chinese Office Action and Searh Report, dated Jan. 15, 2021, for Chinese Applicaiton No. 201780040341.3, with an English translation.

Korean Office Action for Korean Application No. 10-2013-7037596, dated Apr. 9, 2021, with English translation.

Japanese Office Action for corresponding Japanese Application No. 2017-535469, dated Jun. 22. 2021, with English translation.

Chinese Office Action for Chinese Application No. 201780040341.3, dated Jul. 20, 2021, with English translation.

\* cited by examiner

COMPOSITE SEMIPERMEABLE MEMBRANE AND METHOD FOR PRODUCING COMPOSITE SEMIPERMEABLE MEMBRANE

TECHNICAL FIELD

The present invention relates to a composite semipermeable membrane having a high permeation rate and the high ability to inhibit adhesion of membrane-fouling substances thereto. The composite semipermeable membrane obtained by the present invention is suitable for use in, for example, desalination of brackish water.

BACKGROUND ART

With respect to separation of mixtures, there are various techniques for removing substances (e.g., salts) dissolved in a solvent (e.g., water). In recent years, however, membrane separation methods are coming to be utilized increasingly as processes for energy saving and resource saving. Examples of the membranes for use in the membrane separation methods include microfiltration membranes, ultrafiltration membranes, nanofiltration membranes, and reverse osmosis membranes. These membranes are used in the case of obtaining potable water, for example, from seawater, brackish water, or water containing a harmful substance, and for producing industrial ultrapure water, wastewater treatments, recovery of valuables, etc.

Most of the reverse osmosis membranes and nanofiltration membranes that are commercially available at present are composite semipermeable membranes, and there are two kinds: ones including a supporting membrane and, disposed thereover, a gel layer and an active layer formed by crosslinking a polymer; and ones including an active layer formed by condensation-polymerizing monomers on a supporting membrane. Among such composite semipermeable membranes, composite semipermeable membranes obtained by coating a surface of a supporting membrane with a separation functional layer including a crosslinked polyamide obtained by the polycondensation reaction of a polyfunctional amine with a polyfunctional acid halide are in extensive use as separation membranes having a high permeation rate and high selectively separating properties.

Patent Document 1 discloses a separation membrane including a separation functional layer which includes a polyamide and has a hydrophilic polymer bonded to the polyamide by amide bonds. Patent Document 1 indicates that antifouling properties are attained by the hydrophilic polymer.

BACKGROUND ART DOCUMENT

Patent Document

Patent Document 1: WO 2015/046582

SUMMARY OF THE INVENTION

Problems that the Invention is to Solve

However, investigations made by the present inventors revealed that it is difficult to completely inhibit fouling even with the technique described in Patent Document 1 and the technique has a problem in that once foulants adhere, it is difficult to remove the foulants.

An object of the present invention, which has been achieved in view of the background-art circumstances, is to enable a composite semipermeable membrane to have higher antifouling properties.

Means for Solving the Problems

In order to achieve the above-mentioned object, the present invention has the following configurations.

[1] A composite semipermeable membrane including: a supporting membrane including a substrate and a porous supporting layer; and a separation functional layer disposed on the porous supporting layer, in which the separation functional layer includes: a crosslinked polyamide; and a hydrophilic polymer which is a polymer of a monomer having an ethylenically unsaturated group, and a surface of the separation functional layer has a ratio of the number of oxygen atoms to the number of nitrogen atoms (O/N ratio), both determined by X-ray photoelectron spectrometry, of 1.5-10, and a standard deviation of the O/N ratio of 0.15 or larger.

[2] The composite semipermeable membrane according to [1], in which the hydrophilic polymer satisfies the following (A) and (B):

(A) the hydrophilic polymer has a water content, as measured under conditions of 25° C. and 75% RH, of 40% or higher; and (B) the hydrophilic polymer, in a measurement by total reflection infrared absorption spectroscopy, gives a difference spectrum between 25° C. 75% RH conditions and absolute dry conditions, the difference spectrum in a range of 3,700-2,900 $cm^{-1}$ having a peak top at a wave number of 3,350-3,500 $cm^{-1}$.

[3] The composite semipermeable membrane according to [1] or [2], in which the hydrophilic polymer has a water content, as measured under conditions of 25° C. and 75% RH, of 60% or higher.

[4] The composite semipermeable membrane according to any one of [1] to [3], in which the hydrophilic polymer is a polymer having at least one acidic group.

[5] The composite semipermeable membrane according to [4], in which the acidic group is at least one group selected from the group consisting of a carboxy group, a sulfonate group, a phosphonate group, and a phosphate group.

[6] The composite semipermeable membrane according to any one of [1] to [5], in which the hydrophilic polymer is a polymer including a component derived from any one compound selected from the group consisting of acrylic acid, methacrylic acid, and maleic acid.

[7] The composite semipermeable membrane according to any one of [1] to [6], in which the surface of the separation functional layer, in a measurement by total reflection infrared absorption spectroscopy, gives a spectrum under conditions of 25° C. and 3% RH, the spectrum having an absorbance ratio [$I_{1720}$ (value for absorption peak at 1,720 $cm^{-1}$)/$I_{1610}$ (value for absorption peak at 1,610 $cm^{-1}$)] of 0.10-0.50, and a standard deviation of the absorbance ratio of 0.05 or larger.

[8] The composite semipermeable membrane according to any one of [1] to [7], in which the hydrophilic polymer and the crosslinked polyamide are bonded to each other by amide bonds.

[9] A process for producing a composite semipermeable membrane including: a substrate; a porous supporting layer formed on the substrate; and a separation functional layer formed on the porous supporting layer, the process including performing the following steps (a), (b), and (c) in this order to thereby form the separation functional layer:

(a) a step in which an aqueous solution containing a polyfunctional amine and a solution obtained by dissolving a polyfunctional acid halide in an organic solvent are used to conduct interfacial polycondensation on a surface of a supporting membrane including the substrate and the porous supporting layer, thereby forming a crosslinked polyamide;

(b) a step in which a hydrophilic polymer is introduced onto the crosslinked polyamide obtained in the step (a), by chemical bonds; and (c) a step in which the crosslinked polyamide is brought into contact with a reagent for functional group conversion of amino groups of the crosslinked polyamide, the step (b) including:

(d) a step in which the crosslinked polyamide obtained in the step (a) is brought into contact with a solution containing the hydrophilic polymer; and (e) a step in which formation of the chemical bonds between the crosslinked polyamide obtained in the step (a) and the hydrophilic polymer is accelerated.

[10] The process for producing a composite semipermeable membrane according to [9], in which, in the step (b), a carboxylic-acid derivative is used as the hydrophilic polymer to form amide bonds from amino groups of the crosslinked polyamide and the carboxylic-acid derivative.

[11] The process for producing a composite semipermeable membrane according to [9] or [10], in which the step (e) includes performing at least one operation selected from the group consisting of heating, addition of a nucleophilic catalyst, and addition of a Lewis acid.

Advantage of the Invention

The composite semipermeable membrane of the present invention includes a sufficient amount of a hydrophilic polymer disposed in a membrane surface and, hence, the adhesion of foulant components can be effectively inhibited.

In addition, since the hydrophilic polymer is moderately unevenly present in the membrane surface, an effect is produced in which a hydration water layer including hydration water in a large amount is formed in portions where the hydrophilic polymer is densely present and the hydrophilic polymer shows high mobility in portions where the hydrophilic polymer is sparse, making it easy to remove adhered foulant components.

MODE FOR CARRYING OUT THE INVENTION

1. Composite Semipermeable Membrane

The composite semipermeable membrane of the present invention includes: a supporting membrane including a substrate and a porous supporting layer; and a separation functional layer disposed on the porous supporting layer. The separation functional layer includes a crosslinked polyamide (hereinafter often referred to simply as "polyamide") and a hydrophilic polymer which is a polymer of a monomer having an ethylenically unsaturated group.

(1-1) Separation Functional Layer

The separation functional layer in the composite semipermeable membrane performs the function of separating solutes. Configurations of the separation functional layer, including composition and thickness, may be set in accordance with the intended use of the composite semipermeable membrane.

The separation functional layer specifically includes: a crosslinked polyamide obtained by the interfacial polycondensation of a polyfunctional amine with a polyfunctional acid halide; and a hydrophilic polymer which is a polymer of a monomer having an ethylenically unsaturated group.

The polyfunctional amine preferably includes at least one ingredient selected from among aromatic polyfunctional amines and aliphatic polyfunctional amines.

The aromatic polyfunctional amines are aromatic amines each having two or more amino groups in one molecule thereof, and are not particularly limited. Examples thereof include m-phenylenediamine, p-phenylenediamine, and 1,3,5-triaminobenzene. Examples of N-alkylated derivatives of these amines include N,N-dimethyl-m-phenylenediamine, N,N-diethyl-m-phenylenediamine, N,N-dimethyl-p-phenylenediamine, and N,N-diethyl-p-phenylenediamine. Especially preferred from the standpoint of stably exhibiting the performances is m-phenylenediamine (hereinafter referred to as m-PDA) or 1,3,5-triaminobenzene.

The aliphatic polyfunctional amines are aliphatic amines each having two or more amino groups in one molecule thereof, and preferably are piperazine-based amines and derivatives thereof. Examples thereof include piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, and ethylenediamine. Especially preferred from the standpoint of stably exhibiting the performances is piperazine or 2,5-dimethylpiperazine. One of these polyfunctional amines may be used alone, or a mixture of two or more thereof may be used.

The polyfunctional acid halide is an acid halide having two or more halogenocarbonyl groups in one molecule thereof, and is not particularly limited so long as the acid halide reacts with the polyfunctional amine to yield a polyamide. As the polyfunctional acid halide, use can be made, for example, of halides of oxalic acid, malonic acid, maleic acid, fumaric acid, glutaric acid, 1,3,5-cyclohexanetricarboxylic acid, 1,3-cyclohexanedicarboxylic acid, 1,4-cyclohexanedicarboxylic acid, 1,3,5-benzenetricarboxylic acid, 1,2,4-benzenetricarboxylic acid, 1,3-benzenedicarboxylic acid, and 1,4-benzenedicarboxylic acid. Preferred of such acid halides are acid chlorides. Trimesoyl chloride (hereinafter referred to as TMC), which is an acid halide of 1,3,5-benzenetricarboxylic acid, is preferred especially from the standpoints of profitability, availability, handleability, reactivity, etc. One of those polyfunctional acid halides may be used alone, or a mixture of two or more thereof may be used.

The polyamide has amide groups derived from the polymerization reaction of the polyfunctional amine with the polyfunctional acid halide and further has amino and carboxy groups derived from unreacted terminal functional groups. The amount of these functional groups affects the water permeability and salt removal ratio of the composite semipermeable membrane.

In cases when a chemical treatment is conducted after the formation of a polyamide, it is possible to convert functional groups present in the polyamide or to introduce new functional groups into the polyamide. Thus, the water permeation rate and salt removal ratio of the composite semipermeable membrane can be improved. Examples of the functional groups to be introduced include alkyl groups, alkenyl groups, alkynyl groups, halogen groups, hydroxyl group, amino group, carboxy group, ether groups, thioether groups, ester groups, aldehyde group, nitro group, nitroso group, nitrile group, and azo group.

For example, introducing azo groups into the polyamide is preferred because this improves the salt removal ratio. It is preferred to introduce azo groups so that the ratio of (molar equivalent of azo groups)/(molar equivalent of amide groups) in the polyamide is 0.1-1.0. In cases when the ratio is 0.1-1.0, a high salt removal ratio can be obtained.

The amino group proportion "(molar equivalent of amino groups)/(molar equivalent of amide groups)" in the separation functional layer relates to the durability of the composite semipermeable membrane. It is preferred to convert some of the amino groups into other functional group(s) so that the amino group proportion becomes 0.18 or less. In cases when the ratio of "(molar equivalent of amino groups)/(molar equivalent of amide groups)" is 0.18 or less, the layer has enhanced toughness to improve the durability of the membrane.

The contents of these functional groups in the polyamide can be determined, for example, by $^{13}C$ solid NMR spectroscopy. Specifically, the substrate is peeled from the composite semipermeable membrane to obtain the separation functional layer and the porous supporting layer. Thereafter, the porous supporting layer is dissolved away to obtain the separation functional layer. The separation functional layer obtained is examined by DD/MAS-$^{13}C$ solid NMR spectroscopy, and the integral of a peak assigned to the carbon atom having each functional group bonded thereto is calculated. The content of each functional group can be determined from the integral.

In the present invention, the polymer of a monomer having an ethylenically unsaturated group is a hydrophilic polymer from the standpoint of antifouling properties. The monomer having an ethylenically unsaturated group will be described later.

The hydrophilic polymer in the present invention is a polymer which dissolves in 1 L of water in an amount of 0.5 g or larger under the conditions of 25° C. The hydrophilic polymer according to the present invention preferably has a water content, as measured under the conditions of 25° C. and 75% RH, of 40% or higher. The water content thereof can be determined using the following expression (1), where $W_{dry}$ is the weight of the polymer in an absolute dry state and $W_{75}$ is the equilibrium weight thereof measured under the conditions of 25° C. and 75% RH.

[Math. 1]
$$\text{Water content } u = \frac{W_{75} - W_{dry}}{W_{dry}} \times 100 \quad (1)$$

In cases when the hydrophilic polymer has a water content, as measured under the conditions of 25° C. and 75% RH, of 40% or higher, the separation membrane shows high antifouling properties. The term "antifouling properties" herein can mean both the property of being inhibited from suffering fouling and the property of undergoing a limited decrease in performance after fouling has occurred. The reasons why the antifouling properties are obtained due to the hydrophilic polymer are thought to be as follows.

The hydrophilic polymer, owing to the hydration structure thereof, can inhibit fouling substances from adhering to the separation functional layer. The fouling inhibition by the hydration structure is effective against any of nonionic, cationic, and anionic fouling substances. In cases when the hydrophilic polymer is present in the surface of the separation functional layer, fouling substances are more apt to adhere to the hydrophilic polymer than to the polyamide. Namely, even if fouling substances adhere to the surface of the separation functional layer, the fouling substances which have adhered are thought to be located apart from the polyamide because of the hydrophilic polymer. Consequently, the separation membrane is inhibited from decreasing in performance. It is hence preferable that the hydrophilic polymer is present in the surface of the separation functional layer. In other words, it is preferable that the separation functional layer should include a first layer, which includes a polyamide as a main component thereof, and a second layer, which includes a hydrophilic polymer as a main component thereof, and that the first layer is disposed on the side facing the porous supporting layer. In cases when the water content of the hydrophilic polymer as measured under the conditions of 25° C. and 75% RH is 40% or higher, the separation functional layer retains a sufficient hydration structure and exhibits excellent antifouling properties. The water content thereof is more preferably 50% or higher, even more preferably 60% or higher.

The hydrophilic polymer according to the present invention, in the measurement by total reflection infrared absorption spectroscopy (hereinafter referred to as ATR-IR), preferably gives a difference spectrum between 25° C. 75% RH conditions and absolute dry conditions, the difference spectrum in the range of 3,700-2,900 $cm^{-1}$ having a peak top at a wave number of 3,350-3,500 $cm^{-1}$.

The peak appearing in the range of 3,700-2,900 $cm^{-1}$ in the difference spectrum indicates absorption attributable to the stretching vibration of the O—H bonds of the water molecule. The wavelength at which the absorption attributable to the stretching vibration of the O—H bonds of the water molecule occurs varies depending on the degree of hydrogen bonding; the peak for a water molecule strongly combined by hydrogen bonding with another water molecule or the like shifts to the smaller-wave-number side, while the peak for a water molecule which is present in an isolated state and is low in hydrogen bonding shifts to the larger-wave-number side. Namely, a water molecule which has a weak interaction with the hydrophilic polymer and has strongly combined with surrounding water molecules by hydrogen bonding gives a peak on the smaller-wave-number side, while a water molecule which has a strong interaction with the hydrophilic polymer and is isolated to have weakly combined with surrounding water molecules by hydrogen bonding gives a peak on the larger-wave-number side.

In cases when the peak top of the difference spectrum lies at a wave number of 3,350 $cm^{-1}$ or larger, the interaction between water molecules and the hydrophilic polymer is so strong that the hydrophilic polymer can retain hydration water. In cases when the peak top of the difference spectrum lies at a wave number of 3,500 $cm^{-1}$ or smaller, the rate of exchanging the hydration water is high to such a degree that the adhesion of foulants can be inhibited. Thus, in cases when the hydrophilic polymer has water molecules which give a difference spectrum having a peak top at a wave number of 3,350-3,500 $cm^{-1}$, the separation functional layer exhibits excellent antifouling properties. The wave number at which the peak top appears in the difference spectrum may be 3,380 $cm^{-1}$ or larger, and may be 3,430 $cm^{-1}$ or smaller.

In the composite semipermeable membrane of the present invention in a dry state, the ratio of the number of oxygen atoms in the surface of the separation functional layer to the number of nitrogen atoms therein (O/N ratio), both determined by X-ray photoelectron spectrometry, is 1.5-10, and a standard deviation of the O/N ratio is 0.15 or larger.

The O/N ratio roughly indicates the proportion of the number of hydrophilic functional groups to the number of monomer units of the polyamide. Since the O/N ratio is 1.5 or larger, hydrophilic functional groups are present in a sufficient amount and excellent antifouling properties are exhibited due to the hydration water retained by the hydrophilic functional groups. The ON ratio is preferably 1.8 or larger. That the ON ratio is 10 or less means that the layer formed of the hydrophilic polymer has a small thickness, and high water permeability is hence obtained. The ON ratio is preferably 5 or smaller. In cases when arbitrarily selected thirty portions in one composite semipermeable membrane are examined for O/N ratio and an average value of these is within that range, then this composite semipermeable membrane is regarded as satisfying that requirement.

Standard deviation is an index to unevenness in distribution. When a value of ON ratio is expressed by x and the number of measuring portions is expressed by N, a value of the standard deviation of the O/N ratio can be determined using the following expression (2).

[Math. 2]

$$\text{Standard deviation } \sigma = \sqrt{\frac{\sum_{i=1}^{N}(x_i - \bar{x})^2}{N}} \left( \bar{x} \text{ is average of } x \ \bar{x} = \frac{\sum_{i=1}^{N} x_i}{N} \right) \quad (2)$$

Since the standard deviation of ON ratio is 0.15 or larger, the hydrophilic polymer is moderately unevenly present in the surface. Because of this, portions where the hydrophilic polymer is densely present contain hydration water in a large amount to thereby form a layer of hydration water, while in portions where the hydrophilic polymer is sparse, the hydrophilic polymer shows high mobility to make it easy to remove adhered foulants. As a result, the composite semipermeable membrane is thought to have improved antifouling properties. The standard deviation of ON ratio is more preferably 0.20 or larger, or 0.25 or larger. In cases when arbitrarily selected thirty portions in one composite semipermeable membrane are examined for O/N ratio and a standard deviation calculated from the results of the examination is within that range, this composite semipermeable membrane is regarded as satisfying that requirement.

In the present invention, it is preferable that the hydrophilic polymer and the crosslinked polyamide should have been bonded to each other by amide bonds. Specifically, it is preferable that the hydrophilic polymer should have been bonded to the polyamide, which is a main component of the separation functional layer, by amide bonds via terminal amino groups of the polyamide. Namely, it is preferable that the hydrophilic polymer included in the second layer should have been bonded by amide bonds to the polyamide included in the first layer.

That the hydrophilic polymer is present in a large amount in the surface of the separation functional layer can be ascertained by repeating a series of examination operations including detecting the hydrophilic polymer on the surface of the separation functional layer, thereafter etching the surface, and further detecting the hydrophilic polymer.

In cases when the hydrophilic polymer and the polyamide have been bonded to each other by amide bonds, the composite semipermeable membrane can exhibit high antifouling properties. In case where the hydrophilic polymer has been bonded by weak bonds or an interaction, this hydrophilic polymer may be readily removed by washing with a chemical, etc.; this configuration is hence undesirable.

It is preferable that the hydrophilic polymer according to the present invention should have at least one acidic group, especially from the standpoints of the effect of improving solubility in water and the effect of diminishing the adhesion of negatively charged foulants.

Preferred acidic groups are a carboxy group, a phosphonate group, a phosphate group, and a sulfonate group. One of these acidic groups may be contained alone in the hydrophilic polymer, or two or more thereof may be contained. With respect to the structures of these acidic groups, the acidic groups may be present in the form of any of the acid form, ester compound, anhydride, and metal salt.

As described above, the polymer of a monomer having an ethylenically unsaturated group is a hydrophilic polymer. Although the monomer having an ethylenically unsaturated group can contain two or more acidic groups, preferred monomers are ones each having one or two acidic groups, from the standpoint of the availability of the monomers.

Examples of monomers having a carboxy group, among the monomers having an ethylenically unsaturated group, include maleic acid, maleic anhydride, acrylic acid, methacrylic acid, itaconic acid, 2-(hydroxymethyl)acrylic acid, 4-(meth)acryloyloxyethyltrimellitic acid and the corresponding anhydride, 10-methacryloyloxydecylmalonic acid, N-(2-hydroxy-3-methacryloyloxypropyl)-N-phenylglycine, and 4-vinylbenzoic acid. Acrylic acid, methacrylic acid, and maleic acid are preferred of these from the standpoints of suitability for general uses, copolymerizability, etc.

Examples of monomers having a phosphonate group, among the monomers having an ethylenically unsaturated group, include vinylphosphonic acid, 4-vinylphenylphosphonic acid, 4-vinylbenzylphosphonic acid, 2-methacryloyloxyethylphosphonic acid, 2-methacrylamidoethylphosphonic acid, 4-methacrylamido-4-methylphenylphosphonic acid, 2-[4-(dihydroxyphosphoryl)-2-oxybutyl]acrylic acid, and 2,4,6-trimethylphenyl 2-[2-(dihydroxyphosphoryl)ethoxymethyl]acrylate.

Examples of monomers having a phosphate group, among the monomers having an ethylenically unsaturated group, include 2-methacryloyloxypropyl monohydrogen phosphate, 2-methacryloyloxypropyl dihydrogen phosphate, 2-methacryloyloxyethyl monohydrogen phosphate, 2-methacryloyloxyethyl dihydrogen phosphate, 2-methacryloyloxyethyl phenyl hydrogen phosphate, dipentaerythritol pentamethacryloyloxyphosphate, 10-methacryloyloxydecyl dihydrogen phosphate, dipentaerythritol pentamethacryloyloxyphosphate, mono(1-acryloylpiperidin-4-yl) phosphate, 6-(methacrylamido)hexyl dihydrogen phosphate, and 1,3-bis(N-acryloyl-N-propylamino)propan-2-yl dihydrogen phosphate.

Examples of monomers having a sulfonate group, among the monomers having an ethylenically unsaturated group, include vinylsulfonic acid, 4-vinylphenylsulfonic acid, and 3-(methacrylamido)propylsulfonic acid.

The hydrophilic polymer to be used in the present invention preferably has a weight-average molecular weight of 2,000 or higher. The introduction of the hydrophilic polymer into the surface of the polyamide separation functional layer is thought to be effective in inhibiting foulants from adhering to the membrane surface, by the mobility of the hydrophilic polymer. The weight-average molecular weight of the hydrophilic polymer is more preferably 5,000 or higher, even more preferably 100,000 or higher.

The hydrophilic polymer may be a homopolymer of any of the monomers having an ethylenically unsaturated group, or may be a copolymer of two or more monomers in accordance with purposes. Examples of the copolymer ingredients include polyvinylpyrrolidone, poly(vinyl alcohol), poly(vinyl acetate), poly(ethylene glycol), poly(propylene glycol), polyethylenimine, polyvinylamine, polyallylamine, and block, graft, or random copolymers of any of these hydrophilic polymers with a hydrophobic polymer. Polyvinylpyrrolidone, poly(vinyl alcohol), and poly(vinyl acetate) are preferred of these hydrophilic polymers from the standpoints of ease of copolymerization and reduced susceptibility to foulant adhesion.

In the hydrophilic polymer, the proportion of structures containing an acidic group as a monomer unit is preferably 5-100 mol %. Namely, the ratio of (number of moles of monomer(s) having an acidic group)/(number of moles of the monomer(s) constituting the hydrophilic polymer) (copolymerization ratio) in the monomer(s) constituting the hydrophilic polymer is preferably from 5% to 100%. In cases when the proportion of monomer units containing an acidic group in the hydrophilic polymer is 5 mol % or higher, this hydrophilic polymer is sufficiently bonded to the polyamide and, hence, foulant adhesion to the membrane surface is inhibited by the mobility of the hydrophilic polymer. The proportion of the structures containing an acidic group is more preferably 10-100 mol %, even more preferably 40-100 mol %.

It is preferable that the surface of the separation functional layer, in the measurement by ATR-IR, gives a spectrum under conditions of 25° C. and 3% RH, the spectrum having an absorbance ratio ($I_{1720}/I_{1610}$) of 0.10-0.50 ($I_{1720}$ is a value for absorption peak at 1,720 cm$^{-1}$; $I_{1610}$ is a value for absorption peak at 1,610 cm$^{-1}$).

$I_{1720}$ shows a peak attributable to carbonyl groups of the hydrophilic polymer and $I_{1610}$ shows a peak attributable to amide groups of the polyamide, and the absorbance ratio is a value which indicates the amount of the hydrophilic polymer relative to the amount of the polyamide. Too small amounts of the hydrophilic polymer result in insufficient antifouling properties, while too large amounts thereof result in increased resistance and a decrease in water permeability. Consequently, the absorbance ratio is preferably 0.10-0.50.

It is thought that the larger the standard deviation of absorbance ratio ($I_{1720}/I_{1610}$), the higher the unevenness in the amount of the hydrophilic polymer present in the membrane surface. From the standpoint that the hydrophilic polymer is present moderately unevenly in the surface, the standard deviation of absorbance ratio ($I_{1720}/I_{1610}$) is preferably 0.05 or larger. In cases when the standard deviation thereof is 0.05 or larger, portions where the hydrophilic polymer is densely present contain hydration water in a large amount to thereby form a layer of hydration water, while in portions where the hydrophilic polymer is sparse, the hydrophilic polymer shows high mobility to make it easy to remove adhered foulants. As a result, the composite semipermeable membrane is thought to have improved antifouling properties. The standard deviation of absorbance ratio ($I_{1720}/I_{1610}$) can be calculated from the results of an examination of arbitrarily selected thirty portions by ART-IR.

The surface of the separation functional layer preferably has a root-mean-square surface roughness (hereinafter referred to also as RMS) of 60 nm or higher. In cases when the root-mean-square surface roughness thereof is 60 nm or higher, this separation functional layer has an increased surface area, resulting in an increase in permeation rate. Meanwhile, in case where the root-mean-square surface roughness thereof is less than 60 nm, a decrease in permeation rate results.

The root-mean-square surface roughness can be determined with an atomic force microscope (hereinafter referred to as AFM). The root-mean-square surface roughness is the square root of an average of the squares of deviations of distance from a reference plane to a specified surface. The term "measurement surface" means a surface indicated by all the measurement data; the term "specified surface" means a specific portion of the measurement surface for which roughness is to be determined and which has been specified by a clip; and the term "reference plane" means a plane which is represented by Z=Z0, where Z0 is an average height of the specified surface. As the AFM, use can be made, for example, of NanoScope IIIa, manufactured by Digital Instruments.

The root-mean-square surface roughness of the surface of the separation functional layer can be controlled by regulating monomer concentrations and temperature when the separation functional layer is formed by interfacial polycondensation. For example, a low temperature during the interfacial polycondensation results in a lower root-mean-square surface roughness, while a high temperature results in a higher root-mean-square surface roughness. In the case where the surface of a separation functional layer is modified with a hydrophilic polymer, a large thickness of the hydrophilic-polymer layer results in a lower root-mean-square surface roughness. It is hence preferred to conduct the modification so as to result in a root-mean-square surface roughness of 60 nm or higher.

(1-2) Supporting Membrane

The supporting membrane serves to impart strength to the separation functional layer, and the supporting membrane itself has substantially no separating performance concerning separation of ions and the like. The supporting membrane includes a substrate and a porous supporting layer.

The porous supporting layer is not particularly limited in the size or distribution of pores thereof. For example, preferred is a porous supporting layer which has even fine pores or has fine pores that gradually increase in size from the surface thereof on the side where the separation functional layer is to be formed to the surface thereof on the other side and in which the size of the fine pores as measured in the surface on the side where the separation functional layer is to be formed is 0.1 nm to 100 nm.

The supporting membrane can be obtained, for example, by pouring a polymer on a substrate to thereby form a porous supporting layer on the substrate. There are no particular limitations on the materials to be used for the supporting membrane or on the shape thereof.

Examples of the substrate include fabric including at least one polymer selected from among polyesters and aromatic polyamides. It is especially preferred to use polyesters which are highly stable mechanically and thermally.

As the fabric for use as the substrate, it is preferred to use long-fiber nonwoven fabric or short-fiber nonwoven fabric. The substrate is required to have excellent suitability for membrane formation so as to avoid the following troubles: when a polymer solution is poured onto a substrate, the solution infiltrates thereinto excessively to reach the back surface; the porous supporting layer peels off the substrate; and the membrane has defects, such as unevenness or pinholes, due to the fluffing, etc. of a substrate. Consequently, use of long-fiber nonwoven fabric is more preferred.

Examples of the long-fiber nonwoven fabric include long-fiber nonwoven fabric including thermoplastic continuous filaments. In cases when the substrate includes long-fiber nonwoven fabric, it is possible to inhibit unevenness and membrane defects from occurring due to fiber fluffing during the pouring of a polymer solution as in the case of using short-fiber nonwoven fabric. Furthermore, since tension is applied to the substrate in the direction of membrane formation in the step of continuously producing the composite semipermeable membrane, it is preferable that long-fiber nonwoven fabric having excellent dimensional stability should be used as the substrate.

In particular, in cases when the fibers of the substrate which are disposed on the side opposite from the porous supporting layer are longitudinally oriented with respect to the direction of membrane formation, this substrate can retain strength and be prevented from suffering membrane breakage, etc. This substrate is hence preferred. The term "longitudinal orientation" herein means that the orientation direction of the fibers is parallel with the direction of membrane formation. In the reverse case in which the orientation direction of the fibers is perpendicular to the direction of membrane formation, this fiber orientation is referred to as transverse orientation.

The degree of fiber orientation of the nonwoven-fabric substrate may be as follows. The degree of orientation of the fibers disposed on the side opposite from the porous supporting layer is preferably 0°-25°. The degree of fiber orientation is an index which indicates the directions of the fibers of the nonwoven-fabric substrate constituting the supporting membrane, and that term means an average angle of the fibers constituting the nonwoven-fabric substrate in cases when the direction of membrane formation in continuous membrane formation is taken as 0° and the direction perpendicular to the membrane formation direction, i.e., the width direction of the nonwoven-fabric substrate, is taken as 90°. Consequently, the closer the degree of fiber orientation to 0°, the more the fibers are longitudinally oriented, while the closer the degree of fiber orientation to 90°, the more the fibers are transversely oriented.

Although the steps for producing the composite semipermeable membrane or the steps for producing an element include a heating step, a phenomenon occurs in which the supporting membrane or the composite semipermeable membrane shrinks due to the heating. Especially in continuous membrane formation, the membrane is prone to shrink more along the width direction, in which no tension is being applied. Since the shrinkage of the supporting membrane or composite semipermeable membrane poses problems concerning dimensional stability, etc., substrates having a low degree of thermal dimensional change are desirable.

In cases when the nonwoven-fabric substrate is one in which the difference in the degree of orientation between the fibers disposed on the side opposite from the porous supporting layer and the fibers disposed on the side facing the porous supporting layer is 10°-90°, this substrate is effective in reducing width-direction changes due to heat and is hence preferred.

The substrate has an air permeability of preferably 2.0 cc/cm$^2$/sec or higher. In cases when the air permeability thereof is within that range, the composite semipermeable membrane has an increased permeation rate. The reason for this is thought to be as follows. In the step of forming a supporting membrane, when the substrate on which a polymer has been poured is immersed in a coagulating bath, non-solvent displacement from the substrate side proceeds at an increased rate to give a porous supporting layer having a changed internal structure. This internal structure affects monomer retention amount and diffusion rate in the subsequent step of forming a separation functional layer, thereby producing the effect shown above.

Air permeability can be measured with a Frazir type tester in accordance with JIS L1096 (2010). For example, a piece having a size of 200 mm×200 mm is cut out from the substrate to obtain a sample. This sample is set in the Frazir type tester, and the suction fan and the air hole are regulated so that the inclined barometer reads a pressure of 125 Pa. The amount of air which passed through the substrate, i.e., air permeability, can be calculated from the pressure indicated by the vertical barometer and the kind of the air hole used. As the Frazir type tester, use can be made, for example, of KES-F8-AP1, manufactured by Kato Tech Co., Ltd.

The thickness of the substrate is preferably in the range of 10 μm to 200 μm, more preferably in the range of 30 μm to 120 μm.

Usable as materials for the porous supporting layer are homopolymers and copolymers such as polysulfones, polyethersulfones, polyamides, polyesters, cellulosic polymers, vinyl polymers, poly(phenylene sulfide), poly(phenylene sulfide sulfone)s, poly(phenylene sulfone), and poly(phenylene oxide). These polymers can be used alone or as a blend thereof. Usable as the cellulosic polymers are cellulose acetate, cellulose nitrate, and the like. Usable as the vinyl polymers are polyethylene, polypropylene, poly(vinyl chloride), polyacrylonitrile, and the like. Preferred of these are homopolymers and copolymers such as polysulfones, polyamides, polyesters, cellulose acetate, cellulose nitrate, poly(vinyl chloride), polyacrylonitrile, poly(phenylene sulfide), and poly(phenylene sulfide sulfone)s. More preferred examples include cellulose acetate, polysulfones, poly(phenylene sulfide sulfone)s, and poly(phenylene sulfone). Of these materials, polysulfones can be generally used since this material is highly stable chemically, mechanically, and thermally and is easy to mold.

Specifically, a polysulfone made up of repeating units represented by the following chemical formula is preferred because use of this polysulfone renders pore diameter control of the supporting membrane easy and this supporting membrane has high dimensional stability.

[Chem. 1]

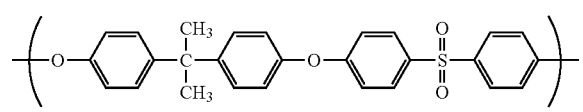

For example, an N,N-dimethylformamide (hereinafter referred to as DMF) solution of the polysulfone is cast in a certain thickness on densely woven polyester fabric or nonwoven polyester fabric, and the solution cast is coagulated by a wet process in water. Thus, a supporting membrane can be obtained in which most of the surface has fine pores with a diameter of several tens of nanometers or less.

The thickness of the supporting membrane affects the strength of the composite semipermeable membrane to be obtained and the packing density in an element fabricated using the composite semipermeable membrane. From the standpoint of obtaining sufficient mechanical strength and sufficient packing density, the thickness of the supporting membrane is preferably in the range of 30 μm to 300 μm, more preferably in the range of 100 μm to 220 μm.

The morphology of the porous supporting layer can be examined with a scanning electron microscope, transmission electron microscope, or atomic force microscope. For example, in the case of an examination with a scanning electron microscope, the porous supporting layer is peeled from the substrate and thereafter fractured by freeze fracturing to obtain a sample for cross-section examination. This sample is thinly coated with platinum, platinum-palladium, or ruthenium tetrachloride, preferably with ruthenium tetrachloride, and is examined with a high-resolution field emission scanning electron microscope (UHR-FE-SEM) at an accelerating voltage of 3-15 kV. As the high-resolution filed emission scanning electron microscope, use can be made, for example, of electron microscope Type S-900, manufactured by Hitachi Ltd.

The supporting membrane to be used in the present invention can be selected from various commercial materials such as "Millipore Filter VSWP" (trade name), manufactured by Millipore Corp., and "Ultra Filter UK10" (trade name), manufactured by Toyo Roshi Ltd. The supporting membrane can be produced, for example, by the method described in Office of Saline Water Research and Development Progress Report, No. 359 (1968).

The thickness of the porous supporting layer is preferably in the range of 20 µm to 100 µm. In cases when the thickness of the porous supporting layer is 20 µm or larger, satisfactory pressure resistance is obtained and an even supporting membrane having no defects can be obtained. The composite semipermeable membrane including such a porous supporting layer can hence exhibit satisfactory salt removal performance. In case where the thickness of the porous supporting layer exceeds 100 µm, unreacted substances remain in an increased amount after the production and this results in a decrease in permeation rate and a decrease in chemical resistance.

The thickness of the substrate and the thickness of the composite semipermeable membrane can be measured with a digital thickness gauge. Since the separation functional layer is extremely thin as compared with the supporting membrane, the thickness of the composite semipermeable membrane can be regarded as the thickness of the supporting membrane. Consequently, the thickness of the porous supporting layer can be easily calculated by measuring the thickness of the composite semipermeable membrane with a digital thickness gauge and subtracting the thickness of the substrate from the thickness of the composite semipermeable membrane. As the digital thickness gauge, use can be made, for example, of PEACOCK, manufactured by Ozaki MFG. Co., Ltd. In the case of using a digital thickness gauge, a thickness measurement is made with respect to twenty portions and an average value thereof is calculated.

In the case where the thickness of the substrate or the thickness of the composite semipermeable membrane is difficult to measure with a digital thickness gauge, the thickness thereof may be determined with a scanning electron microscope. A thickness measurement is made on electron photomicrographs of cross-sections of arbitrarily selected five portions in a sample, and an average thereof is calculated to thereby determine the thickness.

2. Process for Producing the Composite Semipermeable Membrane

A process for producing the composite semipermeable membrane is explained next. The process includes a step of forming a supporting membrane and a step of forming a separation functional layer.

(2-1) Step of Forming Supporting Membrane

The step of forming a supporting membrane includes: a step in which a polymer solution is applied to a substrate; and a step in which the substrate to which the polymer solution has been applied is immersed in a coagulating bath to coagulate the polymer.

In the step of applying a polymer solution to a substrate, a polymer which is the component of the porous supporting layer is dissolved in a good solvent for the polymer, thereby preparing the polymer solution.

In the case of using a polysulfone as the polymer, the temperature of the polymer solution at the time of application of the polymer solution is preferably 10-60° C. In cases when the temperature of the polymer solution is within that range, the polymer solution sufficiently infiltrates into interstices among the fibers of the substrate and is then solidified without suffering polymer precipitation. As a result, the porous supporting layer is tenaciously bonded to the substrate by the anchoring effect, and a satisfactory supporting membrane can be obtained. The preferred range of the temperature of the polymer solution can be suitably regulated in accordance with the kind of the polymer used, desired solution viscosity, etc.

The time period from application of the polymer solution to the substrate to immersion in a coagulating bath is preferably 0.1-5 seconds. In cases when the time period to immersion in a coagulating bath is within that range, the organic-solvent solution containing the polymer sufficiently infiltrates into interstices among the fibers of the substrate before being solidified. The preferred range of the time period to immersion in a coagulating bath can be suitably regulated in accordance with the kind of the polymer solution used, desired solution viscosity, etc.

Water is usually used as the coagulating bath. However, any coagulating bath in which the polymer, which is the component of the porous supporting layer, does not dissolve may be used. The membrane morphology of the supporting membrane to be obtained changes depending on the composition of the coagulating bath, and the composite semipermeable membrane to be obtained changes accordingly. The temperature of the coagulating bath is preferably −20° C. to 100° C., more preferably 10-50° C. In cases when the temperature of the coagulating bath is within that range, this coagulating bath does not suffer severe surface vibrations due to thermal movement, and the membrane thus formed retains surface smoothness. In addition, in cases when the temperature of the coagulating bath is within that range, an appropriate coagulation rate and a satisfactory membrane formation efficiency are obtained.

The supporting membrane thus obtained is then washed with hot water in order to remove the solvent remaining in the membrane. The temperature of this hot water is preferably 40-100° C., more preferably 60-95° C. In cases when the temperature of the hot water is within that range, the supporting membrane does not shrink to a high degree and brings about a satisfactory permeation rate. In addition, in cases when the temperature of the hot water is within that range, a sufficient washing effect is obtained.

(2-2) Step of Forming Separation Functional Layer

Next, the step of forming a separation functional layer, which is a component of the composite semipermeable membrane, is explained. In the step of forming a separation functional layer according to the present invention, the following steps (a), (b), and (c) are performed in this order:

(a) a step in which an aqueous solution containing a polyfunctional amine and a solution obtained by dissolving a polyfunctional acid halide in an organic solvent are used to conduct interfacial polycondensation on a surface of a supporting membrane including the substrate and the porous supporting layer, thereby forming a crosslinked polyamide;

(b) a step in which a hydrophilic polymer is introduced onto the crosslinked polyamide obtained, by chemical bonds; and (c) a step in which the crosslinked polyamide is brought into contact with a reagent for functional group conversion of amino groups of the crosslinked polyamide.

The step (b) includes: (d) a step in which the crosslinked polyamide obtained in the step (a) is brought into contact with a solution containing the hydrophilic polymer; and (e) a step in which formation of the chemical bonds between the crosslinked polyamide obtained in the step (a) and the hydrophilic polymer is accelerated.

A first layer, which includes a polyamide as a main component thereof, is formed in step (a), and a second layer, which includes a hydrophilic polymer as a main component thereof, is thereafter formed on the surface of the first layer in step (b). Step (b) is a step of introducing a hydrophilic polymer onto the crosslinked polyamide by chemical bonds. Since the hydrophilic polymer is thought to hardly pass through the crosslinked polyamide, which substantially performs a separating function, the second layer is formed on the surface of the first layer. Meanwhile, step (c) is a step of subjecting the amino groups to functional group conversion. By performing step (c) after step (b), the hydrophilic polymer can be introduced in a larger amount than in the case of performing step (c) before step (b), thereby improving the antifouling properties.

The steps (a), (b), and (c), in the case of performing these steps in that order, are explained below.

In step (a), the organic solvent for dissolving a polyfunctional acid halide therein may be any organic solvent which is immiscible with water and which neither damages the supporting membrane nor inhibits the reaction for yielding a crosslinked polyamide. Representative examples thereof include liquid hydrocarbons and halogenated hydrocarbons such as trichlorotrifluoroethane. From the standpoints of freedom from ozone layer depletion, availability, handleability, and safety during handling, it is preferred to use one of or a mixture of two or more of octane, nonane, decane, undecane, dodecane, tridecane, tetradecane, heptadecane, hexadecane, cyclooctane, ethylcyclohexane, 1-octene, 1-decene, and the like.

The aqueous solution containing a polyfunctional amine and the solution obtained by dissolving a polyfunctional acid halide in the organic solvent may contain compounds such as an acylation catalyst, polar solvent, acid scavenger, surfactant, and antioxidant according to need, so long as these compounds do not inhibit the reaction between the two ingredients.

In order to conduct the interfacial polycondensation on a surface of the supporting membrane, the surface of the supporting membrane is first coated with the aqueous solution containing a polyfunctional amine. The concentration of this aqueous solution containing a polyfunctional amine is preferably 0.1-20% by weight, more preferably 0.5-15% by weight.

For coating the surface of the supporting membrane with the aqueous solution containing a polyfunctional amine, any method may be used so long as the surface of supporting membrane is evenly and continuously coated with the aqueous solution. Use may be made of a known coating technique such as, for example, a method in which the aqueous solution is applied to the surface of the supporting membrane or a method in which the supporting membrane is immersed in the aqueous solution. The period during which the supporting membrane is in contact with the aqueous solution containing a polyfunctional amine is preferably in the range of 5 seconds to 10 minutes, more preferably in the range of 10 seconds to 3 minutes.

It is preferred to subsequently remove the excessively applied aqueous solution in an excess solution removal step. Examples of methods for removing the excess solution include a method in which the membrane is held vertically to make the excess aqueous solution flow down naturally. After the removal of the excess solution, the membrane surface may be dried to remove some or all of the water contained in the aqueous solution.

Thereafter, a solution obtained by dissolving the polyfunctional acid halide in an organic solvent is applied to the supporting membrane which has been coated with the aqueous solution containing a polyfunctional amine, and a crosslinked polyamide is formed by interfacial polycondensation. The period during which the interfacial polycondensation is performed is preferably 0.1 second to 3 minutes, more preferably 0.1 second to 1 minute.

The concentration of the polyfunctional acid halide in the solution obtained by dissolving the polyfunctional acid halide in an organic solvent is not particularly limited. However, in case where the concentration thereof is too low, there is a possibility that the formation of a polyamide as an active layer might be insufficient, resulting in defects. Meanwhile, too high concentrations thereof are disadvantageous from the standpoint of cost. Consequently, the concentration of the polyfunctional acid halide is preferably about 0.01-1.0% by weight.

After the reaction, it is preferred to remove some of the solution obtained by dissolving the polyfunctional acid halide in an organic solvent, in an excess solution removal step. For removing some of the solution, use can be made, for example, of a method in which the membrane is held vertically to make the excess solution flow down naturally, thereby removing the excess solution. In this case, the period during which the membrane is held vertically is preferably 1-5 minutes, more preferably 1-3 minutes. In cases when the holding period is 1 minute or longer, a polyamide having the desired function is easy to obtain. In cases when the holding period is 3 minutes or less, the occurrence of defects due to excessive drying of the solution can be inhibited, and a decrease in performance can hence be inhibited.

Next, the polyamide obtained by the method described above is washed with hot water at a temperature in the range of 25-90° C. for 1-60 minutes. Thus, the solute rejection performance and permeation rate of the composite semipermeable membrane can be further improved. However, in case where the hot water has too high a temperature and the polyamide is rapidly cooled after the hot-water washing, the composite semipermeable membrane comes to have reduced chemical resistance. It is therefore preferred to conduct the hot-water washing at a temperature in the range of 25-60° C. In the case of conducting the hot-water washing at a high temperature of 61-90° C., it is preferred to gradually cool the polyamide after the hot-water washing. For example, there is a method in which the polyamide is cooled to room temperature by bringing the polyamide into contact with hot water so that the water temperature becomes lower in stages.

In the step of hot-water washing, the hot water may contain an acid or an alcohol. The inclusion of an acid or an alcohol facilitates control of the formation of hydrogen bonds in the polyamide. Examples of the acid include inorganic acids such as hydrochloric acid, sulfuric acid, and phosphoric acid and organic acids such as citric acid and oxalic acid. It is preferred to regulate the concentration of the acid so as to result in a pH of 2 or less. The pH is more preferably 1 or less. Examples of the alcohol include monohydric alcohols such as methyl alcohol, ethyl alcohol, and isopropyl alcohol and polyhydric alcohols such as ethylene glycol and glycerin. The concentration of the alcohol is preferably 10-100% by weight, more preferably 10-50% by weight.

Next, in step (b), a hydrophilic polymer is introduced onto the crosslinked polyamide by chemical bonds. From the standpoint of inhibiting the hydrophilic polymer from being removed by chemical washing, etc., the chemical bonds are preferably covalent bonds, especially preferably amide bonds. This step specifically includes: a step in which the crosslinked polyamide is brought into contact with a solution containing a hydrophilic polymer; and a step in which the formation of chemical bonds between the hydrophilic polymer and amino or carboxy groups of the crosslinked polyamide is accelerated.

Methods for bringing the crosslinked polyamide into contact with the solution containing a hydrophilic polymer are not limited to specific ones, and any method such as, for example, spraying, coating, or immersion may be used so long as the hydrophilic polymer can come into contact with the crosslinked polyamide.

Examples of the hydrophilic polymer include carboxylic-acid derivatives. The carboxylic-acid derivatives are compounds containing a functional group obtained by converting a carboxy group. In an especially preferred embodiment of the present invention, the carboxylic-acid derivatives are compounds having a functional group having improved reactivity with an amino group. Examples of the carboxylic-acid derivatives include carbonyl chlorides, carbonyl bromides, and active esters.

For converting a carboxylic acid (compound having a carboxyl group) into a carbonyl chloride, use can be made of thionyl chloride, phosphorus trichloride, phosphorus pentachloride, sulfuryl chloride, or oxalyl chloride. Also usable suitably are triphenylphosphine, carbon tetrachloride, and 2,4,6-trichloro-1,3,5-triazine, which do not generate hydrogen chloride as a by-product. For conversion into carbonyl bromides, phosphorus tribromide can be used.

The active esters are esters having an excellent leaving ability unlike ordinary ester bonds as in, for example, alkyl esters. Such leaving groups can be obtained by converting a carboxy group using any of the condensing agents shown below.

Condensing agents usable for converting carboxylic acids (compounds having a carboxy group) into carboxylic-acid derivatives are not particularly limited. Use can be made of: carbodiimide-based condensing agents such as N,N-dicyclohexylcarbodiimide, N,N-diisopropylcarbodiimide, 1-[3-(dimethylamino)propyl]-3-ethylcarbodiimide and the hydrochloride thereof, and N-cyclohexyl-N'-(2-morpholinoethyl)carbodiimide metho-p-toluenesulfonate; phosphonium-based condensing agents such as 1H-benztriazol-1-yloxytris(dimethylamino)phosphonium hexafluorophosphate, 1H-benztriazol-1-yloxytripyrrolidinophosphonium hexafluorophosphate, chlorotripyrrolidinophosphonium hexafluorophosphate, and bromotripyrrolidinophosphonium hexafluorophosphate; uronium-based condensing agents such as {{[(1-cyano-2-ethoxy-2-oxoethylidene)amino]oxy}-4-morpholinomethylene}dimethylammonium hexafluorophosphate, O-(7-azabenztriazol-1-yl)-N,N,N',N'-tetramethyluronium hexafluorophosphate and tetrafluoroborate, and 0-(benzotriazol-1-yl)-N,N,N',N'-tetramethyluronium hexafluorophosphate and tetrafluoroborate; and triazine-based condensing agents such as 4-(4,6-dimethoxy-1,3,5-triazin-2-yl)-4-methylmorpholinium chloride (hereinafter referred to as DMT-MM) and (4,6-dimethoxy-1,3,5-triazin-2-yl)(2-octoxy-2-oxoethyl)dimethylammonium trifluoromethanesulfonate.

The conversion into a carboxylic-acid derivative may be conducted before the polyamide is brought into contact with the hydrophilic polymer. Namely, a solution containing a hydrophilic polymer which is a carboxylic-acid derivative may be brought into contact with the polyamide. Use may also be made of a method in which a reagent that converts a hydrophilic polymer into a carboxylic-acid derivative through conversion of a carboxy group is incorporated into a solution containing a hydrophilic polymer which is a carboxylic acid and this solution is brought into contact with the polyamide. Namely, a reagent for converting a hydrophilic polymer into a carboxylic-acid derivative may be caused to be present when the hydrophilic polymer is brought into contact with the polyamide.

An alkali metal compound, such as sodium carbonate, sodium hydroxide, potassium hydroxide, sodium phosphate, or potassium phosphate, or a tertiary amine compound, such as triethylamine or N-methylmorpholine, may be added in order to accelerate the conversion into a carboxylic-acid derivative.

Furthermore, a surfactant such as sodium dodecyl sulfate or sodium benzenesulfonate can be advantageously used as another additive in order to remove substances remaining in the polyamide, such as any water-immiscible organic solvent, monomers such as the polyfunctional acid halide and polyfunctional amine compound, and oligomers yielded by the reaction of these monomers.

One hydrophilic polymer may be brought into contact with the crosslinked polyamide, or a mixture of two or more hydrophilic polymers may be brought into contact with the crosslinked polyamide. It is preferred to use the hydrophilic polymer(s) in the form of a solution having a concentration of 10 ppm to 1% by weight. In cases when the concentration of the hydrophilic polymer(s) is 10 ppm or higher, the hydrophilic polymer(s) can be sufficiently reacted with functional groups present in the polyamide. Meanwhile, in case where the concentration thereof exceeds 1%, a hydrophilic-polymer layer having a large thickness may be formed, resulting in a decrease in permeation rate.

The solution containing both a hydrophilic polymer and a reagent for converting the hydrophilic polymer into a carboxylic-acid derivative is not particularly limited in the concentration of the reagent so long as the concentration thereof is higher than the concentration of convertible carboxy groups. Such concentration of the reagent can produce a sufficient effect in the condensation with reactive groups.

The solvent in the solution containing both a hydrophilic polymer and a reagent for converting the hydrophilic polymer into a carboxylic-acid derivative is not particularly limited so long as both the hydrophilic polymer and the reagent for converting the hydrophilic polymer into a carboxylic-acid derivative can dissolve therein. In many cases, use of a protic solvent, such as methanol or ethanol, or water results in a reaction between the solvent and the carboxylic-acid derivative, and it is hence preferred to use an aprotic solvent. However, in the case where any of the triazine-based condensing agents is used, a protic solvent or water can be advantageously used since the active ester formed has resistance thereto.

Amino groups on the surface of a layer of the crosslinked polyamide react with the carboxylic-acid derivative included in the hydrophilic polymer, thereby forming amide bonds. Thus, a hydrophilic polymer is introduced. Methods for bringing the solution containing a hydrophilic polymer into contact with the layer of the crosslinked polyamide are not particularly limited. For example, the membrane may be entirely immersed in the solution containing a hydrophilic polymer, or the solution containing a hydrophilic polymer may be sprayed on the surface of the layer of the crosslinked polyamide. Methods for the contact are not limited so long as the polyamide comes into contact with the hydrophilic polymer.

In the case where the hydrophilic polymer is a carboxylic-acid derivative and the chemical bonds between the polyamide and the hydrophilic polymer are amide bonds, the step of accelerating the formation of the chemical bonds includes a step in which amidation between the carboxylic-acid derivative and amino groups of the crosslinked polyamide is accelerated. The acceleration of the amidation can be attained by improving the reactivity of the carboxylic-acid derivative, improving the reactivity of the amine, or improving both of them. Examples of methods for accelerating the amidation include a method in which the reaction is accelerated by heating, a method in which a nucleophilic catalyst is added, and a method in which a Lewis acid is added. It is possible to decompose the excess carboxylic-acid derivative to inhibit side reactions, while accelerating the amidation reaction.

The step of accelerating the amidation reaction is conducted for a period of preferably 10 seconds to 30 minutes, more preferably 20 seconds to 15 minutes. In cases when the step of accelerating the amidation reaction is conducted in that period, a hydrophilic polymer can be moderately unevenly introduced onto the crosslinked polyamide.

The heating may be conducted by elevating the ambient temperature with hot air or by heating in a bath of, for example, water. The heating temperature is preferably 60-90° C., more preferably 70-85° C. By heating the reactants to 60° C. or higher, the amidation reaction can be made to proceed sufficiently. By regulating the heating temperature to 90° C. or lower, the membrane can be inhibited from suffering a decrease in water permeability due to thermal shrinkage. The heating time is not particularly limited, and is preferably 10 seconds to 30 minutes, more preferably 20 seconds to 15 minutes, for the reason shown above.

Examples of the nucleophilic catalyst include pyridine compounds such as 4-dimethylaminopyridine and 4-pyrrolidinopyridine, tertiary phosphines such as triphenylphosphine and tributylphosphine, and imidazole and derivatives thereof. The nucleophilic reagent reacts with the carboxylic-acid derivative to become an excellent leaving group, thereby accelerating the amidation reaction. For adding the nucleophilic catalyst, use may be made of a method in which the nucleophilic catalyst is added beforehand to the solution containing a hydrophilic polymer or is added after contact with the polyamide. The amount of the nucleophilic catalyst is preferably 0.01-0.5 equivalents, more preferably 0.05-0.3 equivalents, to the carboxy groups. However, in the case where the carboxylic-acid derivative is a compound which yields an acid, e.g., hydrochloric acid or bromic acid, through the reaction, such as, for example, a carbonyl chloride or a carbonyl bromide, the nucleophilic catalyst is undesirably deactivated by the acid and it is hence preferred to add the catalyst in an amount of 1 equivalent or larger.

The Lewis acid is not particularly limited. However, rare-earth Lewis acids, such as yttrium(III) trifluoromethanesulfonate, ytterbium(III) trifluoromethanesulfonate, and scandium(III) trifluoromethanesulfonate, and indium(III) chloride are preferred because these compounds are applicable even in water solvent. The Lewis acid coordinates to the carbonyl group of the carboxylic-acid derivative, thereby improving the reactivity. The amount of the Lewis acid is preferably 0.01-0.5 equivalents, more preferably 0.05-0.3 equivalents, to the carboxy groups.

Next, in step (c), the polyamide is brought into contact with a reagent for functional group conversion of amino groups of the polyamide, thereby converting the amino groups into another functional group. Especially preferred is to conduct the functional-group conversion by bringing the polyamide into contact with a reagent which reacts with the amino groups to yield a diazonium salt or a derivative thereof. Examples of the reagent which reacts with the amino groups to yield a diazonium salt or a derivative thereof include aqueous solutions of nitrous acid, salts thereof, nitrosyl compounds, and the like. Since aqueous solutions of nitrous acid or a nitrosyl compound have the property of decomposing while evolving a gas, it is preferred to gradually yield nitrous acid by reaction between a nitrous acid salt and an acidic solution. Although nitrous acid salts generally react with hydrogen ions to yield nitrous acid ($HNO_2$), the formation of nitrous acid ($HNO_2$) proceeds efficiently when the pH of the aqueous solution is 7 or less, preferably 5 or less, more preferably 4 or less. Especially preferred from the standpoint of easy handling is an aqueous solution of sodium nitrite reacted with hydrochloric acid or sulfuric acid in aqueous solution.

The concentration of the nitrous acid or nitrous acid salt in the reagent which reacts with amino groups to yield a diazonium salt or a derivative thereof is preferably in the range of 0.01-1% by weight, more preferably in the range of 0.05-0.5% by weight. In cases when the concentration thereof is 0.01% by weight or higher, a sufficient effect is obtained. In cases when the concentration thereof is 1% by weight or less, the solution is easy to handle.

The temperature of the aqueous solution of nitrous acid is preferably 15-45° C. In cases when the temperature thereof is 15° C. or higher, a sufficient reaction rate is obtained. In cases when the temperature thereof is 45° C. or lower, this solution is easy to handle because the nitrous acid is less apt to decompose.

The period during which the polyamide is in contact with the aqueous solution of nitrous acid may be any period sufficient for at least one of a diazonium salt and a derivative thereof to be yielded. Higher concentrations enable the treatment to be carried out in a short time period, while lower concentrations necessitate a longer time period. Consequently, in the case of the solution having the concentration shown above, the contact period is preferably 10 minutes or shorter, more preferably 3 minutes or shorter. Methods for the contact are not particularly limited. A solution of the reagent may be applied to the polyamide, or the membrane may be immersed in a solution of the reagent. The solvent for dissolving the reagent therein may be any solvent in which the reagent dissolves and which does not corrode the membrane. The solution may contain a surfactant, acidic compound, alkaline compound, etc. so long as these ingredients do not inhibit the reaction between amino groups and the reagent.

Next, a part of the diazonium salt or derivative thereof which has been yielded is converted to a different functional group. A part of the diazonium salt or derivative thereof is converted to a phenolic hydroxyl group, for example, by reaction with water. By bringing a part of the diazonium salt or derivative thereof into contact with a solution containing chloride ions, bromide ions, cyanide ions, iodide ions, fluoroboric acid, hypophosphorous acid, sodium hydrogen sulfite, sulfite ions, an aromatic amine, hydrogen sulfide, thiocyanic acid, or the like, the diazonium salt or derivative thereof is converted to the corresponding functional group.

Furthermore, by contacting with an aromatic amine, a diazo coupling reaction is caused and aromatic groups can be introduced onto the membrane surface. One of those reagents may be used alone, or a mixture of two or more thereof may be used. The polyamide may be brought into contact, multiple times, with different reagents.

Examples of the reagent which causes a diazo coupling reaction include compounds having an electron-rich aromatic ring or heteroaromatic ring. Examples of the compounds having an electron-rich aromatic ring or heteroaromatic ring include unsubstituted heteroaromatic compounds, aromatic compounds having an electron-donating substituent, and heteroaromatic compounds having an electron-donating substituent. Examples of the electron-donating substituent include an amino group, ether group, thioether group, alkyl groups, alkenyl groups, alkynyl groups, and aryl groups. Specific examples of those compounds include aniline, methoxyaniline in which the methoxy group has been bonded to the benzene ring in an ortho, meta, or para position, phenylenediamine in which the two amino groups have been bonded to the benzene ring in ortho, meta, or para positions, 1,3,5-triaminobenzene, 1,2,4-triaminobenzene, 3,5-diaminobenzoic acid, 3-aminobenzylamine, 4-aminobenzylamine, sulfanilic acid, 3,3'-dihydroxybenzidine, 1-aminonaphthalene, 2-aminonaphthalene, and N-alkylation products of these compounds.

3. Use of the Composite Semipermeable Membrane

The composite semipermeable membrane of the present invention is suitable for use as a spiral type composite semipermeable membrane element produced by winding the composite semipermeable membrane around a cylindrical water collection tube having a large number of perforations, together with a raw-water channel member such as a plastic net and a permeate channel member such as tricot and optionally with a film for enhancing pressure resistance. Furthermore, such elements can be connected serially or in parallel and housed in a pressure vessel, thereby configuring a composite semipermeable membrane module.

Moreover, the composite semipermeable membrane or the element or module thereof can be combined with a pump for supplying raw water thereto, a device for pretreating the raw water, etc., thereby configuring a fluid separator. By using this fluid separator, raw water can be separated into permeate such as potable water and concentrate which has not passed through the membrane. Thus, water suited for a purpose can be obtained.

The composite semipermeable membrane of the present invention and fluid separators employing the composite semipermeable membrane can be used at an operation pressure in the low-pressure range of, for example, 0.1-3 MPa, more preferably 0.1-1.55 MPa, while maintaining a high permeation rate. Since the operation pressure can be low, pumps and the like having a lower capacity can be used, making it possible to attain a reduction in electric power consumption and a reduction in fresh-water production cost. Operation pressures lower than 0.1 MPa tend to result in a decrease in permeation rate, while operation pressures exceeding 3 MPa are prone to increase the quantity of electric power consumed by the pump, etc. and to result in membrane clogging due to fouling.

The composite semipermeable membrane of the present invention, when used for 24-hour filtration at 25° C. using an aqueous sodium chloride solution having a pH of 6.5 and a concentration of 2,000 mg/L at an operation pressure of 1.55 MPa, preferably has a permeation rate of 0.50-3.0 m$^3$/m$^2$/day. Such a composite semipermeable membrane can be produced, for example, by suitably selecting the production process described above. The permeation rate of 0.50-3.0 m$^3$/m$^2$/day renders stable fresh-water production possible while appropriately inhibiting fouling. From the standpoint of practical use, the permeation rate is more preferably 0.80-3.0 m$^3$/m$^2$/day.

There are cases where sewage to be treated with the composite semipermeable membrane of the present invention contains poorly biodegradable organic substances, e.g., surfactants, which have not been completely decomposed by a biological treatment. In cases when such sewage is treated with conventional composite semipermeable membranes, the surfactants are adsorbed onto the membrane surfaces, undesirably resulting in a decrease in permeation rate. In contrast, the composite semipermeable membrane of the present invention has a high permeation rate and the property of readily releasing membrane-fouling substances and can hence stably exhibit the performances.

The composite semipermeable membrane of the present invention is highly able to inhibit membrane-fouling substances from adhering thereto. Specifically, in cases when an aqueous solution having a temperature of 25° C., a pH of 6.5, and an NaCl concentration of 2,000 mg/L is filtrated for 1 hour at a pressure of 1.55 MPa and the amount of the resultant permeate is expressed by F1 and when the above-described aqueous solution to which polyoxyethylene(10) octylphenyl ether has been added in a concentration of 100 mg/L is subsequently filtrated for 1 hour and the amount of the resultant permeate is expressed by F2, then the value of F2/F1 is preferably 0.80 or larger. The value of F2/F1 is more preferably 0.90 or larger. By using such a composite semipermeable membrane, membrane surface fouling is rendered less apt to occur and a high permeation rate can be stably maintained over a long period.

Furthermore, the composite semipermeable membrane of the present invention exhibits high resistance to chemicals. In cases when the value of F2/F1 determined just after the membrane production is expressed by F3 and the F2/F1 of the membrane which has undergone 20-hour immersion in an aqueous sulfuric acid solution having a pH of 1 is expressed by F4, then the value of F4/F3 is preferably 0.85 or larger. The value of F4/F3 is more preferably 0.90 or larger. Use of such a composite semipermeable membrane is advantageous in that in cases when fouling substances have adhered to the membrane surface in a long-term operation to reduce the water permeability, the fouling substances can be removed by performing a washing operation, thereby enabling the composite semipermeable membrane to retain high antifouling properties.

EXAMPLES

The present invention will be explained below by reference to Examples, but the present invention is not limited to the following Examples in any way.

(NaCl Removal Ratio)

Evaluation water regulated so as to have a temperature of 25° C., pH of 7, and sodium chloride concentration of 2,000 ppm was supplied to a composite semipermeable membrane at an operation pressure of 1.55 MPa to perform a membrane filtration treatment. The feed water and the permeate were examined for electrical conductivity with electrical conductivity meter "WM-50EG", manufactured by Toa Electronics Ltd., thereby obtaining the practical salinity, i.e., NaCl concentration, of each. The NaCl removal ratio was calculated on the basis of the thus-obtained NaCl concentrations and the following equation.

NaCl removal ratio (%)=100×{1−(NaCl concentration in permeate)/(NaCl concentration in feed water)}

(Membrane Permeation Flux)

In the test shown in the preceding section, the rate of permeation of the feed water (aqueous NaCl solution) through the membrane was measured. The amount was expressed in terms of water permeation rate ($m^3$) per membrane area of $m^2$ per day and this rate was taken as the membrane permeation flux ($m^3/m^2$/day).

(Membrane Performance)

Membrane performance was determined in the following manner. First, a 25° C. aqueous solution having a pH of 6.5 and an NaCl concentration of 2,000 mg/L was filtrated for 1 hour at a pressure of 1.55 MPa and the amount of the resultant permeate was measured as an initial permeate amount (F1). Subsequently, the aqueous solution to which polyoxyethylene(10) octylphenyl ether had been added in a concentration of 100 mg/L was filtrated for 1 hour and the amount of the resultant permeate was expressed by F2. The value of F2/F1 was calculated.

(Durability)

The value of F2/F1 for a composite semipermeable membrane just after production was expressed by F3 and that for the composite semipermeable membrane which had undergone 20-hour immersion in an aqueous sulfuric acid solution having a pH of 1 was expressed by F4. The value of F4/F3 was calculated to determine the durability (chemical resistance) of the composite membrane.

(Water Content)

A hydrophilic polymer was dissolved in water and the pH was adjusted to 7. Thereafter, a powder was obtained therefrom by freeze drying. The powder obtained was allowed to stand still in an atmosphere regulated so as to have a temperature of 25° C. and a humidity of 75% RH, until the weight change became 0.1% or less, and the weight thereof was measured. Thereafter, the powder was heated and dried at 50° C. for 24 hours, and the weight of the dried powder was measured. The water content was calculated from the obtained weights using the expression (1) given hereinabove.

(ATR-IR)

A hydrophilic polymer was allowed to stand still in 25° C. atmospheres respectively regulated so as to have humidities of 75% RH and 3% RH, until the weight change became 0.1% or less. Using FT-IR spectrometer Avatar 360, manufactured by Nicolet K.K., and using a one-time-reflection type horizontal ATR measuring device (OMNI-Sampler) and an ATR crystal made of germanium, both manufactured by the same company, as accessories for total reflection spectroscopy, the surface of the hydrophilic polymer was irradiated with infrared light to thereby obtain a spectrum. With respect to measuring conditions, the resolution was set at 4 $cm^{-1}$ and the number of scans was set at 256. The spectra thus obtained were subjected to an automatic baseline correction. The spectra thus obtained for the respective humidity conditions were examined for difference therebetween, and the difference spectrum was examined for wave number corresponding to the peak top of a peak appearing at 2,900-3,600 $cm^{-1}$. A composite semipermeable membrane was conditioned in the same manner and arbitrarily selected thirty portions in the surface of the composite semipermeable membrane were examined for spectrum. The intensity ratio between peaks at 1,720 $cm^{-1}$ and 1,610 $cm^{-1}$, $I_{1720}/I_{1610}$, and the standard deviation were calculated.

(X-ray Photoelectron Spectrometry)

The O/N ratio was determined by X-ray photoelectron spectrometry. First, a membrane sample was vacuum-dried at 50° C. for 24 hours to sufficiently remove the water. Using an X-ray photoelectron spectrometer (K-alpha, manufactured by Thermo Fisher Scientific Inc.), arbitrarily selected thirty portions in the surface of the separation functional layer were examined for element composition ratio at a photoelectron detection angle of 90 degrees. An average value of the O/N ratios and the standard deviation thereof were calculated.

(Air Permeability)

Air permeability was measured with Frazir type tester in accordance with JIS L1096 (2010). A piece having a size of 200 mm×200 mm was cut out from the substrate and set in the Frazir type tester. The suction fan and the air hole were regulated so that the inclined barometer read a pressure of 125 Pa. The air permeability was determined from the pressure indicated at that time by the vertical barometer and the kind of the air hole used. As the Frazir type tester, use was made of KES-F8-AP1, manufactured by Kato Tech Co., Ltd.

Production of Composite Semipermeable Membranes

Comparative Example 1

A 15.0% by weight DMF solution of a polysulfone (PSf) was cast, under the conditions of 25° C., on nonwoven polyester fabric configured of long fibers (air permeability, 2.0 cc/$cm^2$/sec), and this nonwoven fabric was immediately immersed in pure water and allowed to stand therein for 5 minutes, thereby producing a supporting membrane including a porous supporting layer having a thickness of 40 μm.

Next, this supporting membrane was immersed in a 3.5% by weight aqueous solution of m-PDA, and the excess aqueous solution was then removed. Furthermore, an n-decane solution containing 0.14% by weight TMC was applied thereto so that the surface of the porous supporting layer was completely wetted by the n-decane solution. Subsequently, in order to remove the excess solution from the membrane, the membrane was vertically held to allow the excess solution to flow down and 25° C. air was blown against the membrane with an air blower to dry the membrane. This membrane was then washed with 40° C. pure water. The composite semipermeable membrane thus obtained was examined for results of ATR-IR spectroscopy, results of X-ray photoelectron spectrometry, membrane performance just after membrane production, membrane performance after fouling, and chemical resistance. As a result, the values shown in Table 1 were obtained.

Comparative Example 2

The composite semipermeable membrane obtained in Comparative Example 1 was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium sulfite solution at 35° C. for 2 minutes, thereby obtaining a composite semipermeable membrane of Comparative Example 2. The composite semipermeable membrane obtained was evaluated. As a result, the membrane performance values shown in Table 1 were obtained.

Comparative Example 3

The composite semipermeable membrane obtained in Comparative Example 1 was kept in contact with an aqueous solution containing 100 ppm poly(acrylic acid) (weight-average molecular weight, 25,000; manufactured by Wako Pure Chemical Ltd.) and 0.1% by weight DMT-MM, at 20° C. for 24 hours and then washed with water. The composite semipermeable membrane obtained was evaluated. As a result, the membrane performance values shown in Table 1 were obtained.

Comparative Example 4

The composite semipermeable membrane obtained in Comparative Example 1 was kept in contact with an aqueous solution containing 100 ppm poly(acrylic acid) (weight-average molecular weight, 25,000; manufactured by Wako Pure Chemical Ltd.), at 20° C. for 24 hours and then washed with water. The composite semipermeable membrane obtained was evaluated. As a result, the membrane performance values shown in Table 1 were obtained.

Example 1

To 0.1 g of poly(acrylic acid) (weight-average molecular weight, 25,000; manufactured by Wako Pure Chemical Ltd.) was added 0.5 g of thionyl chloride. The resultant mixture was refluxed with heating for 20 hours, and the excess thionyl chloride was then removed by vacuum distillation. A hundred grams of hexane was added to the resultant solid matter, and this mixture was applied by spraying to the composite semipermeable membrane obtained in Comparative Example 1. Thereafter, a 10-ppm hexane solution of 4-dimethylaminopyridine was added thereto, and the membrane was allowed to stand still at 25° C. for 10 minutes and washed with water. Subsequently, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Furthermore, the composite semipermeable membrane was immersed in 0.1% by weight aqueous sodium sulfite solution at 35° C. for 2 minutes, thereby obtaining a composite semipermeable membrane of Example 1. The composite semipermeable membrane obtained was evaluated. As a result, the membrane performance values shown in Table 1 were obtained.

Example 2

The composite semipermeable membrane obtained in Comparative Example 1 was brought into contact with an aqueous solution containing 100 ppm poly(acrylic acid) (weight-average molecular weight, 25,000; manufactured by Wako Pure Chemical Ltd.) and 0.1% by weight DMT-MM. Thereafter, a 10-ppm aqueous solution of 4-dimethylaminopyridine was added thereto, and the membrane was allowed to stand still for 10 minutes and washed with water. Subsequently, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Furthermore, the composite semipermeable membrane was immersed in 0.1% by weight aqueous sodium sulfite solution at 35° C. for 2 minutes, thereby obtaining a composite semipermeable membrane of Example 2. The composite semipermeable membrane obtained was evaluated. As a result, the membrane performance values shown in Table 1 were obtained.

Example 3

The composite semipermeable membrane obtained in Comparative Example 1 was brought into contact with an aqueous solution containing 100 ppm poly(acrylic acid) (weight-average molecular weight, 25,000; manufactured by Wako Pure Chemical Ltd.) and 0.1% by weight DMT-MM. Thereafter, the membrane was heated to 80° C., allowed to stand still for 4 minutes, and washed with water. Subsequently, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Furthermore, the composite semipermeable membrane was immersed in 0.1% by weight aqueous sodium sulfite solution at 35° C. for 2 minutes, thereby obtaining a composite semipermeable membrane of Example 3. The composite semipermeable membrane obtained was evaluated. As a result, the membrane performance values shown in Table 1 were obtained.

Example 4

A composite semipermeable membrane was produced in the same manner as in Example 3, except that a poly(acrylic acid)/maleic acid copolymer (weight-average molecular weight, 10,000; trade name, A-6330; manufactured by Toagosei Co., Ltd.) was used in place of the poly(acrylic acid). The composite semipermeable membrane obtained was evaluated. As a result, the membrane performance values shown in Table 1 were obtained.

As apparent from the results given in Table 1, the composite semipermeable membranes of the present invention have a high permeation rate and the high ability to inhibit adhesion of membrane-fouling substances thereto and can stably retain the high performances over a long period.

TABLE 1

| | | Water Content (%) | ATR-IR Peak-top wave number (cm⁻¹) | $I_{1720}/I_{1610}$ (—) | Standard deviation (—) | X-ray photoelectron spectrometry O/N ratio (—) | Standard deviation (—) | Membrane performance just after production NaCl Removal Ratio (%) | Membrane Permeation flux (m³/m²/day) | Membrane performance after fouling Membrane permeation flux (m³/m²/day) | F2/F1 (—) | Chemical resistance F4/F3 (—) |
|---|---|---|---|---|---|---|---|---|---|---|---|---|
| Comparative Example | 1 | — | — | 0.03 | 0.01 | 0.89 | 0.04 | 99.2 | 1.01 | 0.51 | 0.50 | 0.72 |
| | 2 | — | — | 0.04 | 0.02 | 1.10 | 0.05 | 99.3 | 1.50 | 0.76 | 0.51 | 0.94 |
| | 3 | 78 | 3380 | 0.25 | 0.02 | 2.45 | 0.10 | 99.2 | 0.94 | 0.85 | 0.90 | 0.81 |
| | 4 | 78 | 3380 | 0.08 | 0.05 | 1.43 | 0.13 | 99.2 | 0.99 | 0.51 | 0.52 | 0.77 |
| | 5 | 11 | 3330 | 0.03 | 0.01 | 13.5 | 0.02 | 99.4 | 0.79 | 0.56 | 0.71 | 0.79 |
| Example | 1 | 78 | 3380 | 0.11 | 0.08 | 1.58 | 0.23 | 99.2 | 1.43 | 1.30 | 0.91 | 0.88 |
| | 2 | 78 | 3380 | 0.12 | 0.06 | 1.71 | 0.19 | 99.2 | 1.42 | 1.30 | 0.92 | 0.90 |
| | 3 | 78 | 3380 | 0.15 | 0.05 | 1.96 | 0.18 | 99.2 | 1.35 | 1.24 | 0.92 | 0.91 |
| | 4 | 52 | 3430 | 0.18 | 0.07 | 2.07 | 0.19 | 99.2 | 1.32 | 1.20 | 0.85 | 0.90 |

While the invention has been described in detail and with reference to specific embodiments thereof, it will be apparent to one skilled in the art that various changes and modifications can be made therein without departing from the spirit and scope thereof. This application is based on a Japanese patent application filed on Jun. 29, 2016 (Application No. 2016-128624) and a Japanese patent application filed on Jun. 29, 2016 (Application No. 2016-128625), the contents thereof being incorporated herein by reference.

INDUSTRIAL APPLICABILITY

By using the composite semipermeable membrane of the present invention, raw water can be separated into permeate such as potable water and concentrate which has not passed through membrane. Thus, water suited for a purpose can be obtained. The composite semipermeable membrane of the present invention is especially suitable for use in the desalination of brackish water or seawater.

The invention claimed is:

1. A composite semipermeable membrane comprising:
   a supporting membrane comprising a substrate and a porous supporting layer; and
   a separation functional layer disposed on the porous supporting layer,
   wherein the separation functional layer includes a first layer, that includes a polyamide as a main component thereof, and a second layer, that includes a hydrophilic polymer as a main component thereof, and the first layer is disposed so as to face the porous supporting layer; and
wherein the separation functional layer comprises:
   a crosslinked polyamide; and
   a hydrophilic polymer which is a polymer of a monomer having an ethylenically unsaturated group, and
   a surface of the separation functional layer has a ratio of the number of oxygen atoms to the number of nitrogen atoms (O/N ratio) of 1.5 to 10, both determined by X-ray photoelectron spectrometry, with a standard deviation of the O/N ratio of 0.15 or larger; and
   wherein the surface of the separation functional layer, in a measurement by total reflection infrared absorption spectroscopy, gives a spectrum under conditions of 25° C. and 3% RH, the spectrum having an absorbance ratio [$I_{1720}$ (value for absorption peak at 1,720 cm⁻¹)/ $I_{1610}$ (value for absorption peak at 1,610 cm⁻¹)] of 0.10-0.50, and a standard deviation of the absorbance ratio of 0.05 or larger.

2. The composite semipermeable membrane according to claim 1, wherein the hydrophilic polymer satisfies the following (A) and (B):
   (A) the hydrophilic polymer has a water content, as measured under conditions of 25° C. and 75% RH, of 40% or higher; and
   (B) the hydrophilic polymer, in a measurement by total reflection infrared absorption spectroscopy, gives a difference spectrum between 25° C. 75% RH conditions and absolute dry conditions, the difference spectrum in a range of 3,700-2,900 cm⁻¹ having a peak top at a wave number of 3,350-3,500 cm⁻¹.

3. The composite semipermeable membrane according to claim 1, wherein the hydrophilic polymer has a water content, as measured under conditions of 25° C. and 75% RH, of 60% or higher.

4. The composite semipermeable membrane according to claim 1, wherein the hydrophilic polymer is a polymer having at least one acidic group.

5. The composite semipermeable membrane according to claim 4, wherein the acidic group is at least one group selected from the group consisting of a carboxy group, a sulfonate group, a phosphonate group, and a phosphate group.

6. The composite semipermeable membrane according to claim 1, wherein the hydrophilic polymer is a polymer including a component derived from any one compound selected from the group consisting of acrylic acid, methacrylic acid, and maleic acid.

7. The composite semipermeable membrane according to claim 1, wherein the hydrophilic polymer and the crosslinked polyamide are bonded to each other by amide bonds.

8. A process for producing a composite semipermeable membrane according to claim 1, comprising:
   a substrate; a porous supporting layer formed on the substrate; and a separation functional layer formed on the porous supporting layer, wherein the separation functional layer includes a first layer, that includes a polyamide as a main component thereof, and a second layer, that includes a hydrophilic polymer as a main component thereof, and the first layer is disposed so as to face the porous supporting layer;
   the process comprising performing the following steps (a), (b), and (c) in this order to thereby form the separation functional layer:

(a) a step in which an aqueous solution containing a polyfunctional amine and a solution obtained by dissolving a polyfunctional acid halide in an organic solvent are used to conduct interfacial polycondensation on a surface of a supporting membrane comprising the substrate and the porous supporting layer, thereby forming a crosslinked polyamide;

(b) a step in which a hydrophilic polymer is introduced onto the crosslinked polyamide obtained in the step (a), by chemical bonds; and (c) a step in which the crosslinked polyamide is brought into contact with a reagent for functional group conversion of amino groups of the crosslinked polyamide, the step (b) comprising:

(d) a step in which the crosslinked polyamide obtained in the step (a) is brought into contact with a solution containing the hydrophilic polymer; and (e) a step in which formation of the chemical bonds between the crosslinked polyamide obtained in the step (a) and the hydrophilic polymer is accelerated.

9. The process for producing a composite semipermeable membrane according to claim 8, wherein, in the step (b), a carboxylic-acid derivative is used as the hydrophilic polymer to form amide bonds from amino groups of the crosslinked polyamide and the carboxylic-acid derivative.

10. The process for producing a composite semipermeable membrane according to claim 8, wherein the step (e) comprises performing at least one operation selected from the group consisting of heating, addition of a nucleophilic catalyst, and addition of a Lewis acid.

\* \* \* \* \*